(12) United States Patent
Hallmark et al.

(10) Patent No.: US 10,320,034 B2
(45) Date of Patent: Jun. 11, 2019

(54) MODULAR BATTERY WITH BATTERY CELL AND SUBMODULE INTERCONNECTIVITY

(71) Applicant: The Boeing Company, Chicago, IL (US)

(72) Inventors: Dean Sherwin Hallmark, Gurley, AL (US); Larry Alan Foy, Huntsville, AL (US); Patrick W. Johnson, Toney, AL (US); Charles Tracy Compton, Elkmont, AL (US)

(73) Assignee: The Boeing Company, Chicago, IL (US)

( * ) Notice: Subject to any disclaimer, the term of this patent is extended or adjusted under 35 U.S.C. 154(b) by 57 days.

(21) Appl. No.: 15/588,267

(22) Filed: May 5, 2017

(65) Prior Publication Data

US 2018/0254651 A1 Sep. 6, 2018

Related U.S. Application Data

(60) Provisional application No. 62/466,930, filed on Mar. 3, 2017.

(51) Int. Cl.
| | |
|---|---|
| *H01M 2/20* | (2006.01) |
| *H01M 10/42* | (2006.01) |
| *H02J 7/00* | (2006.01) |
| *H01M 2/10* | (2006.01) |

(52) U.S. Cl.
CPC ....... *H01M 10/425* (2013.01); *H01M 2/1077* (2013.01); *H01M 2/206* (2013.01); *H02J 7/0013* (2013.01); *H02J 7/0045* (2013.01); *H01M 2010/4271* (2013.01); *Y02T 10/7055* (2013.01)

(58) Field of Classification Search
CPC .............. H02J 7/0068; H01M 10/425; H01M 2010/4271
USPC .......................................... 320/117, 121, 128
See application file for complete search history.

(56) References Cited

U.S. PATENT DOCUMENTS

| | | | |
|---|---|---|---|
| 5,670,861 A * | 9/1997 | Nor ....................... | B60L 11/185 307/10.7 |
| 9,142,974 B2 * | 9/2015 | Tseng ....................... | H02J 7/00 |
| 2011/0080139 A1 * | 4/2011 | Troxel .................... | H02J 7/007 320/134 |
| 2018/0190956 A1 * | 7/2018 | Lica ...................... | H01M 2/043 |

* cited by examiner

*Primary Examiner* — M Baye Diao
(74) *Attorney, Agent, or Firm* — Miller, Matthias & Hull LLP

(57) ABSTRACT

A modular power system is configured to supply configurable power to a load. The system includes battery submodules, each having at least one submodule circuit that is configured to replaceably connect one or more of a plurality of battery cells to a submodule positive bus and a submodule negative bus. The system further includes a power output that is in operable connection with each of the one or more battery submodules. The power output is configured to receive electrical power transmission from one or more of the plurality of battery cells, via the one or more battery submodules. The power output is further configured to transmit electrical power to the load. The system further includes a configuration circuit configured to interconnect each of the one or more battery submodules, operably connect the one or more battery submodules to the power output, and reconfigure characteristics of electrical power output.

38 Claims, 8 Drawing Sheets

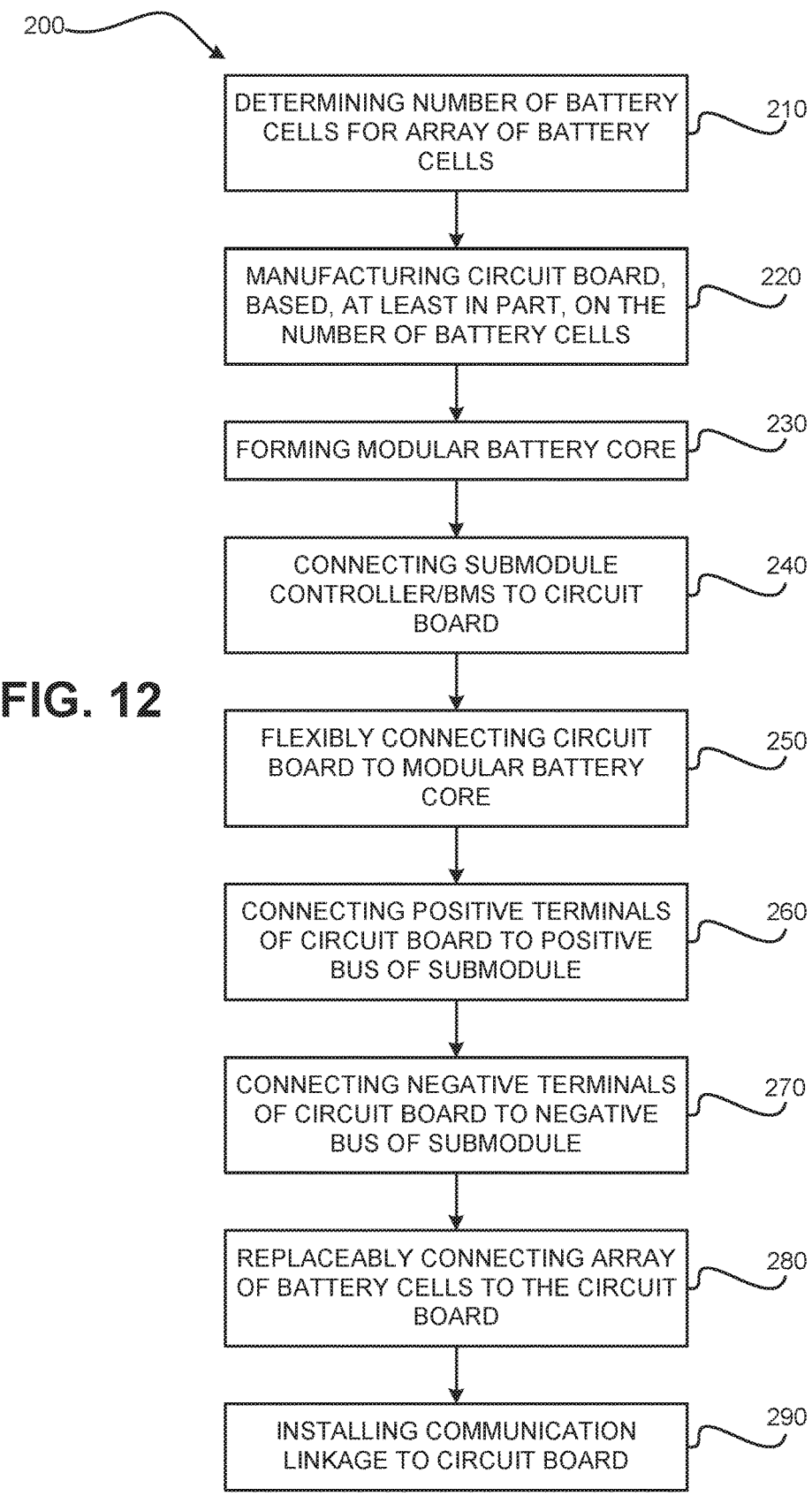

MODULAR BATTERY WITH BATTERY CELL AND SUBMODULE INTERCONNECTIVITY

TECHNICAL FIELD

The present disclosure relates generally to configurable power systems and, more particularly, to modular batteries with replaceably connectable battery cells and submodule interconnectivity.

BACKGROUND

Many modern industrial and/or commercial power applications utilize one or more batteries for supplying electrical power to one or more electrical loads, such as, but not limited to, electrical loads associated with vehicles. These power-demand scenarios often involve connecting the load to one or more batteries in any serial or parallel configuration. In many situations, power system implementation can be limited based on the voltage and capacity capabilities of standard, readily available batteries.

Standard available batteries, both disposable and rechargeable, are, generally, provided with an unconfigurable voltage and unconfigurable capacity. Therefore, such standard batteries may not match the power needs of a particular load, because the given, unconfigurable voltages and capacities of the standard batteries are incompatible with the voltage and/or capacity needs of the load. In some applications, customized batteries (e.g., customized lithium ion or lead acid batteries) are produced to satisfy a particular load; however, design and production of customized batteries can be cost prohibitive and customizable batteries often cannot have their voltage and/or capacity characteristics easily and quickly altered, if the power needs of the load change.

When performance degradation of a battery is detected, the battery is often replaced when the performance of the entire battery falls below acceptable levels. In some usage scenarios, replacement is not performed until the battery has failed, due to a lack of data regarding ongoing operating capacity and/or voltage of the battery. Lack of data regarding ongoing operating capacities of such batteries may not only lead to unwanted and surprising failure of the battery, but may alternatively lead to premature replacement of batteries.

Rather than using a single, standard available battery, some power systems, instead, utilize serial and/or parallel connections of an array of standard batteries, to meet the power demands of a load, if the load's demands deviate from the capabilities of standard available batteries. However, such connective arrays often do not provide an operator or user, associated with the load, information regarding capacity degradation of each of the batteries of the array. Such arrays may be particularly susceptible to failure, as they, typically, are limited by the capabilities of the lowest performing battery. The collective battery performance of the power system may degrade over time, at faster rates, when the batteries are not used optimally, because the operator and/or user associated with the load is unaware of ongoing performance characteristics of said batteries.

Standard available batteries are, typically, not refurbished, but, rather, are recycled for raw materials. To that end, such batteries are both unconfigurable, for providing power to different and/or changing power loads, and, thus, are rendered useless, to the user and/or operator associated with the load, upon failure. For ensuring life of a battery, for enabling customization of voltage and/or capacity output for a load, and/or for providing more affordable power solutions, power systems capable of utilizing replaceable battery submodules, to which standard available batteries may be replaceably connected, are desired.

SUMMARY

In accordance with one example, a modular power system is disclosed. The modular power system is configured to supply configurable power to a load. The system includes one or more battery submodules, each having a submodule positive bus and a submodule negative bus. The one or more battery submodules also include at least one submodule circuit that is configured to replaceably connect one or more of a plurality of battery cells to the submodule positive bus and the submodule negative bus. The system further includes a power output that is in operable connection with each of the one or more battery submodules. The power output is configured to receive electrical power transmission from one or more of the plurality of battery cells, via the one or more battery submodules. The power output is further configured to transmit electrical power to the load. The system further includes a configuration circuit configured to interconnect each of the one or more battery submodules, operably connect the one or more battery submodules to the power output, and reconfigure characteristics of electrical power output.

In accordance with another example, a battery submodule is disclosed. The battery submodule is for use with a modular battery, which is for use in a modular power system. The battery submodule includes a positive bus and a negative bus. The battery submodule further includes at least one circuit board configured to replaceably connect one or more of a plurality of battery cells to the submodule positive bus and the submodule negative bus. The at least one circuit board is configured to provide interconnection of the battery submodule with one or more additional battery submodules and to selectively transmit electrical power from one or more of the plurality of battery cells to an output of the modular power system.

In accordance with yet another example, method for manufacturing a battery submodule is disclosed. The battery submodule is for use in a modular power system, for providing configurable power to a load. The method includes determining a number of battery cells for an array of battery cells, each of the array of battery cells selected from a plurality of battery cells. The method further includes manufacturing at least one circuit board based, at least in part, on the number of battery cells for the array of battery cells. The at least one circuit board is manufactured to include a plurality of positive input terminals corresponding to a plurality of positive battery cell terminals and each of the plurality of positive battery cell terminals of a corresponding one of the array of battery cells. The at least one circuit board is manufactured to include a plurality of negative input terminals corresponding to a plurality of negative battery cell terminals, each of the plurality of negative battery cell terminals of a corresponding one of the array of battery cells. The method further includes connecting each of the plurality of positive input terminals of the at least one circuit board to a positive bus for the battery submodule. The method further includes connecting each of the plurality of negative input terminals of the at least one circuit board to a negative bus for the battery submodule. The method further includes replaceably connecting one or more of the array of battery cells to the at least one circuit board at one of the plurality of positive input terminals and one of the plurality of negative input terminals.

In accordance with yet another example, a method for configuring a modular power system is disclosed. The modular power system is configured to supply configurable electrical power to a load. The method includes selecting a quantity of battery submodules for one or more battery submodules, each of the one or more battery submodules including a submodule positive bus, a submodule negative bus, and at least one submodule circuit configured to replaceably connect one or more of a plurality of battery cells to the submodule positive bus and the submodule negative bus. The method further includes selecting a quantity of battery cells, from the plurality of battery cells, for inclusion in one or more battery cell arrays. The method further includes replaceably connecting at least one of the one or more battery cell arrays to the at least one submodule circuit of one of the one or more battery submodules. The method further includes interconnecting each of the one or more battery submodules using a configuration circuit of the modular power system. The method further includes operably connecting each of the one or more battery submodules to a power output (40) of the modular power system, via the configuration circuit, such that electrical power from at least one of the one or more battery cell arrays is capable of being output to the load via the power output.

These and other aspects and features will become more readily apparent upon reading the following detailed description when taken in conjunction with the accompanying drawings. In addition, although various features are disclosed in relation to specific examples, it is understood that the various features may be combined with each other, or used alone, with any of the various examples without departing from the scope of the disclosure.

BRIEF DESCRIPTION OF THE DRAWINGS

FIG. 12 is an exemplary flowchart for a method for manufacturing a battery submodule, in accordance with an embodiment of the present disclosure While the present disclosure is susceptible to various modifications and alternative constructions, certain illustrative examples thereof will be shown and described below in detail. The disclosure is not limited to the specific examples disclosed, but instead includes all modifications, alternative constructions, and equivalents thereof.

DETAILED DESCRIPTION

Figure 1:
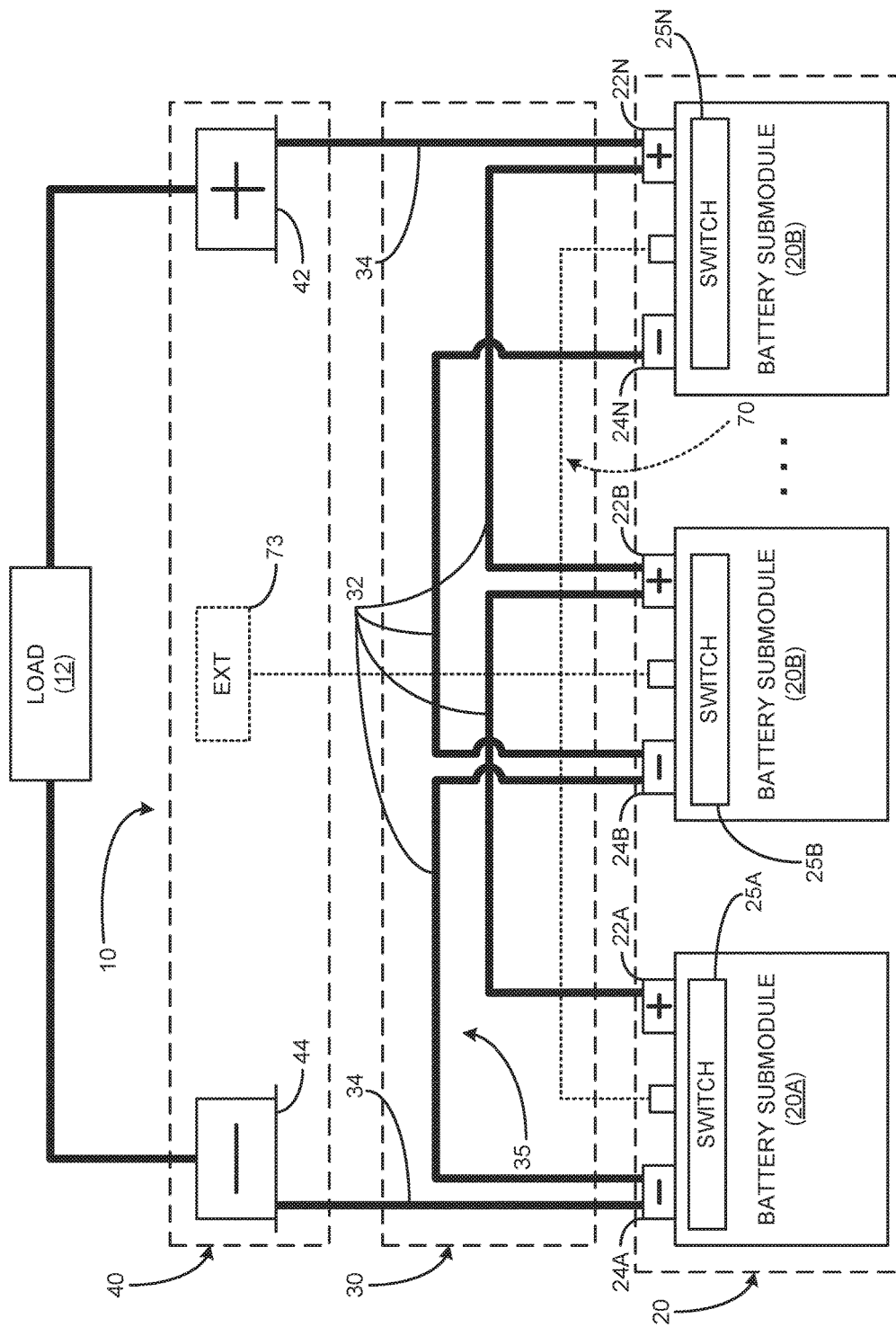
FIG. 1 is a schematic block diagram of an example power system, illustrating exemplary power transmission and interconnectivity of elements of the power system, in accordance with an embodiment of the present disclosure.
Figure 2:
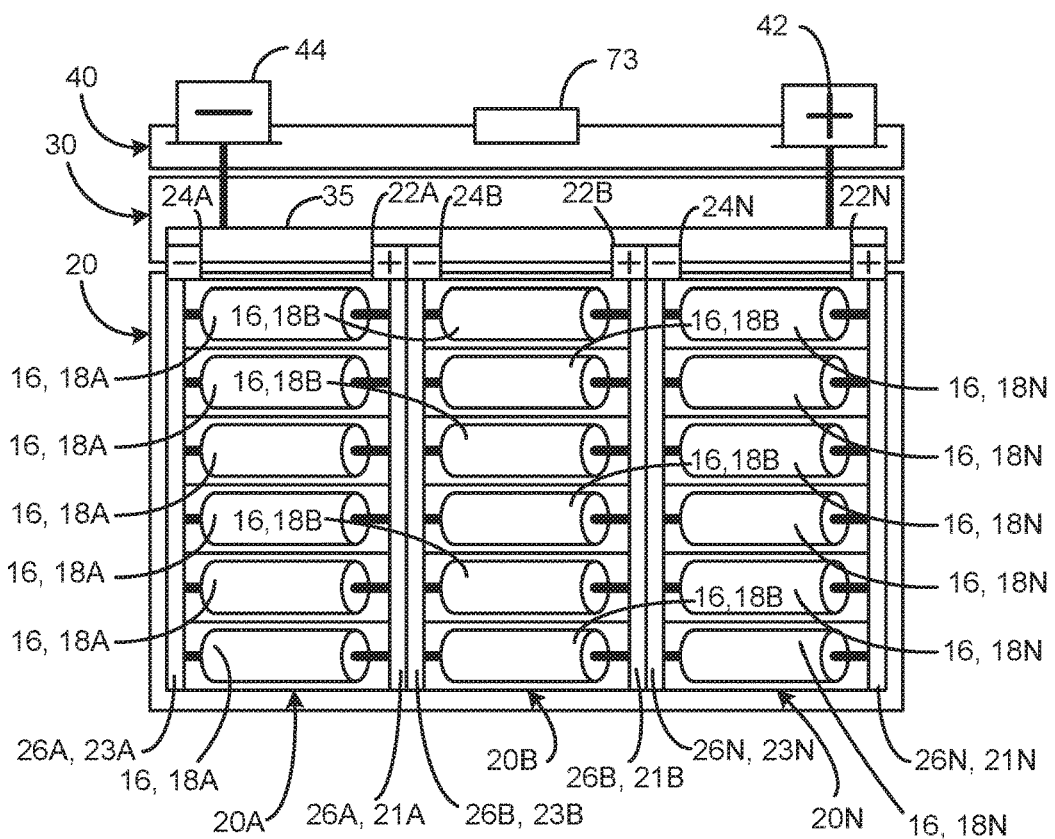
FIG. 2 is an example schematic diagram of the power system of FIG. 1, illustrating exemplary structural configuration of components of the power system, in accordance with the embodiment of FIG. 1 and the present disclosure.

Turning now to the drawings, FIGS. 1 and 2 schematically depict a power system 10, which is configured to supply configurable electrical power to a load 12. The load 12 may be any electrical load, needing electrical power for functionality. To that end, the power system 10 may act as a battery and/or generator for the load 12, configured to power the load 12, for any commercial or industrial application. In a non-limiting example, the load 12 may be one or more electrical components associated with a vehicle, such as an aerial vehicle, and the power system 10 can be utilized to power said load 12. Of course, it is to be appreciated that the power system 10 is certainly not limited to powering transportation and/or aerial vehicle based loads and can be utilized to provide power to any electrical load.

The power system 10 is configured as a modular power system, meaning that the output power of the power system 10 is a configurable output power, which can be user-altered, in order to meet changing power demands. Using such a configurable output power, the power system 10 can make necessary alterations in electrical characteristics of the output power, as needed, to power the load 12. Such alterations can be made in order to meet desired electrical power, current, and/or voltage demands. To that end, in some examples, the power system 10 is configured to be user-altered, in such a manner that the user can alter these characteristics without necessitating professional and/or outside assistance. Further, in some examples, the load 12 may include one or more elements (e.g., an alternator), which provides electrical power to the power system 10, via the same connection from which the power system 10 provides electrical power to the load 12, for recharging one or more rechargeable elements.

In the interest of modularity, the power system 10 includes one or more battery submodules 20 (e.g. 20A, 20B, . . . 20N), each battery submodule 20 being configured to replaceably connect one or more of a plurality of battery cells 16 to the battery submodule 20. Accordingly, the replaceably connected battery cells 16 may provide power to the load 12, when the battery submodule 20 is connected to the load 12, in the broader context of the power system 10.

The one or more battery submodules 20 can include any number of battery submodules, (e.g., a first battery submodule 20A, a second battery submodule 20B, up to an nth battery submodule 20N). Each of the one or more battery submodules 20 includes a submodule positive bus 22 (e.g. 22A, 22B, ... 22N), a submodule negative bus 24 (e.g. 24A, 24B, ..., 24N), and at least one submodule circuit board 26 (e.g. 26A, 26B, ..., 26N) configured to replaceably connect one or more of the plurality of battery cells 16 to the submodule positive bus 22 and the submodule negative bus 24. The submodule positive bus 22 and submodule negative bus 24 provide output power, from the battery cells 16, to other elements of the power system 10 and, ultimately, to the power output 40.

"Replaceably connect," as defined herein, refers to a connection between a battery cell 16 and a submodule circuit board 26 that enables the battery cell 16 to be connected to the submodule circuit board 26, subsequently removed from the submodule circuit board 26, further subsequently reattached to the submodule circuit board 26, and/or further subsequently replaced with another battery cell 16 of the plurality of battery cells 16. Various systems, methods, or apparatus for replaceable connection can be used, including, but not limited to including, welded and/or non-welded connections, as discussed in more detail below.

As depicted in FIG. 2, the battery cells 16, to be used by each of the battery submodules 20, are arranged as battery cell arrays 18 (e.g. 18A, 18B, ..., 18N) of battery cells 16. Accordingly, each battery cell array 18 may correspond with each of the battery submodules 20 (e.g., a first battery cell array 18A corresponding with the first battery submodule 20A, a second battery cell array 18B corresponding with the second battery submodule 20B, up to an nth battery cell array 18N corresponding with the nth battery submodule 20N). The battery cell arrays 18 can be arranged in any appropriate connection, configured for a desired output power from the battery submodule 20 or any sub-groupings of battery cells 16 of the battery cell array 18. To that end, the battery cell arrays 18 can be interconnected in any combination of series and parallel connections, to generate a desired, configurable output power for the respective battery submodule 20.

To that end, internal connections between battery cells 16 of battery cell arrays 18 are capable of being switched on and/or off, in order to configure a output power of the battery submodule 20, via at least one switching device 25 (e.g. 25A, 25B, ..., 25N) associated with the battery submodule 20 and/or the submodule circuit board 26. The switching device 25 is configured to control configurable output power to the load 12, from a given battery submodule 20, by performing one or more of connecting one or more of the battery cells 16 to the submodule circuit board 26, disconnecting one or more of the battery cells 16 to the submodule circuit board 26, reconfiguring a connection between two or more of the plurality of battery cells 16, and any combinations thereof. To perform any of these switching functions, the switching device 25 may include, but is not limited to including, one or more fuses, field effect transistors (FETs), electromechanical switches, relays, contractors, and any combinations thereof. Control of the switching device 25 can be performed based on internal logic of a controller associated with the respective battery submodule 20, based on preset power demands for the load 12, based on manual switching of elements of the switching device 25 by an operator or user of the power system 10, based on instructions from a battery management system 70 (e.g. 70A, 70B), as discussed in more detail below, and any combinations thereof. Further, any number of switching devices 25, and components thereof, can be used, corresponding with any number of battery submodules 20 (e.g., a first switching unit 25A corresponding with the first battery submodule 20A, a second switching unit 25B corresponding with the second battery submodule 20B, up to an nth switching device 25N corresponding with the nth battery submodule 20N).

Figure 3:
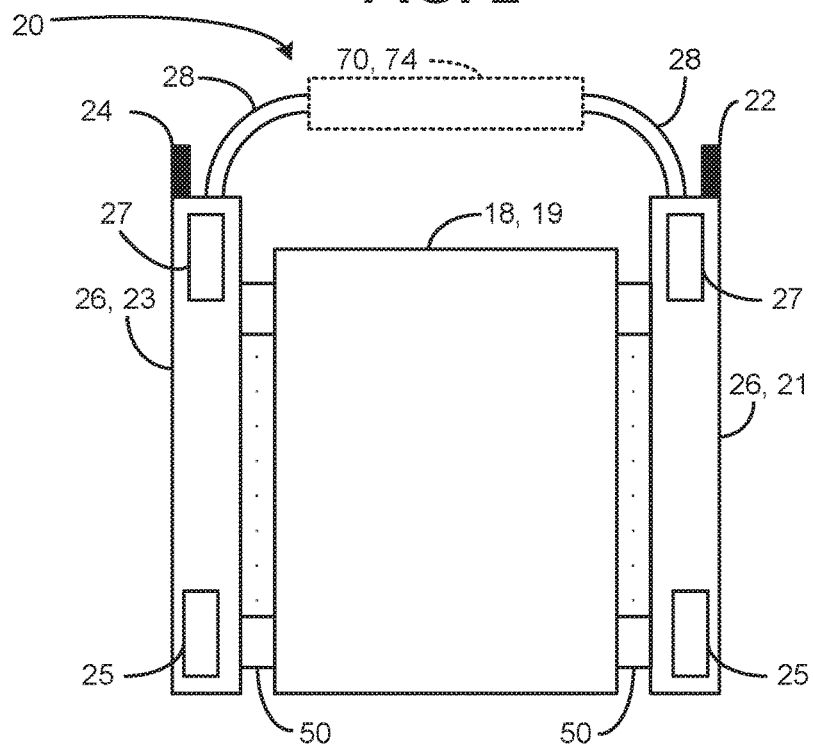
FIG. 3 is an example schematic diagram of a battery submodule, for use in conjunction with the power system of FIGS. 1 and 2, in accordance with an embodiment of the disclosure.

Turning now to FIG. 3, and with continued reference to FIGS. 1 and 2, a detailed schematic view of an exemplary battery submodule 20 is shown. In some examples, the at least one submodule circuit board 26 includes a first circuit board 21 (e.g. 21A, 21B, ..., 21N), which is operatively associated with the submodule positive bus 22, and a second circuit board 23, which is operatively associated with the submodule negative bus 24. In such examples, when in electrical connection with the load 12, the submodule positive bus 22 is in electrical connection with at least one positive terminal of one of the plurality of battery cells 16, via the first circuit board 21, and the submodule negative bus 24 is in electrical connection with the negative terminal of, at least, that same one of the plurality of battery cells 16. Further, to streamline electrical connection from the at least one submodule circuit board 26, to the submodule positive bus 22 and the submodule negative bus 24, in some examples, the submodule positive bus 22 and submodule negative bus 24 are integrated in the at least one submodule circuit board 26. As depicted in FIG. 3, in some examples, the submodule positive bus 22 is integrated with the first circuit board 21 and/or the submodule negative bus 24 is integrated with the second circuit board 23.

Further, in some examples, the submodule circuit board 26 includes or is otherwise operably associated with one or more submodule sensors 27. The submodule sensors 27 are configured to sense operation data associated with one or more of the plurality of battery cells 16, the at least one submodule circuit board 26, and any combinations thereof. To that end, the operation data may include one or more of voltage data, current data, temperature data, cell balance data, and any combinations thereof. For example, the submodule sensors 27 can include voltage sensors for determining voltage associated with any of the plurality of battery cells 16 and/or the battery submodule 20 as a whole, the submodule sensors 27 can include current sensors for determining current associated with any of the plurality of battery cells 16 and/or the battery submodule 20 as a whole. In some examples, the submodule sensors 27 may include temperature sensors for determining temperatures associated with any of the plurality of battery cells 16 and/or the battery submodule 20 as a whole. Data from such temperature sensors may be used to control integrated heaters and/or cooling units of the battery submodule 20 and/or the submodule circuit board 26. Further, the submodule sensors 27 can include capacity sensors, each associated with one or more of the plurality of battery cells 16 and configured to determine ongoing battery capacity of the one or more of the plurality of battery cells 16.

Any data determined or received by the submodule sensors 27 can be communicated to a submodule controller 74 of the battery management system 70, which is capable of controlling output power and/or configuration of the battery submodule 20 based on the data. In some examples, the battery management system 70 is integrated in a circuit of the battery submodule 20. Elements of the battery management system 70 are depicted and/or called out, in the drawings, with dotted lines.

The submodule controller 74, along any other controller of the instant application (e.g., a master controller 72, a first submodule controller 74A, a second submodule controller 74B, an nth submodule controller 74N, an external controller 75, and the like), is embodied by any suitable computing or controlling device capable of executing instructions to perform one or more operations associated with the power system 10 and any elements thereof. To that end, the controller(s) 72, 74, 74A, 74B, 74N, 75 may be any electronic controller or computing system including a processor which operates to perform operations, execute control algorithms, store data, retrieve data, gather data, and/or any other computing or controlling task desired. The controller(s) 72, 74, 74A, 74B, 74N, 75 may be a single controller or may include more than one controller disposed to control various functions and/or features of the power system 10 and/or an overarching system associated with the power system 10 (e.g., a controller operating functions of the load 12). Functionality of the controller(s) 72, 74, 74A, 74B, 74N, 75 may be implemented in hardware and/or software and may rely on one or more data maps relating to the operation of the power system 10. To that end, the controller(s) 72, 74, 74A, 74B, 74N, 75 may include internal memory and/or the controller(s) 72, 74, 74A, 74B, 74N, 75 may be otherwise connected to external memory, such as a database or server. The internal memory and/or external memory may include, but are not limited to including, one or more of read only memory (ROM), random access memory (RAM), a portable memory, and the like. Such memory media are examples of nontransitory memory media.

Returning now to FIG. 3, as discussed above, the first and second circuit boards 21, 23 can be discrete, separate assemblies. In such examples, the entirety of the at least one submodule circuit board 26 can be functionally and/or physically connected using any systems, methods, or apparatus, including, but not limited to, flex circuits, conventional wires and/or cables, and the like. Further, the at least one submodule circuit board 26 provides interconnectivity amongst its respective array of battery cells 18 via any power connectivity systems, methods, or apparatus known in the art, such as, but not limited to, one or more of printed circuit board traces, bus bars, flex circuits, cable assemblies, and any combinations thereof. Further still, one or both of the first and second circuit boards 21, 23, and/or the at least one submodule circuit board 26, as a whole may include or otherwise be associated with heating elements, sensing elements (e.g. one or more of the submodule sensors 27), cooling elements, and/or any other components contemplated for an application of the power system 10. To that end, other sensing, controlling, and/or environmental altering elements may be included with or operatively associated with one or both of the first and second circuit boards 21, 23, and/or the at least one circuit board 26 as a whole, as needed. Particularly, the at least one circuit board 26, and/or the first and second circuit boards 21, 23 thereof, may include such elements to allow notification to systems external of the power system (e.g., the load 12), such that, in undesirable conditions, the power system 10 may have safety shutdown capabilities.

For supporting connection of the battery cell array 18 to the at least one submodule circuit board 26, the battery submodule 20 may include a modular battery core 19, which is any structure capable of housing a number of battery cells 16 (e.g., the battery cell array 18) that is configured to be resized or reconfigured, in proportion with the number of battery cells 16 desired for design of the battery submodule 20 and/or for power demands of the load 12. To connect such a modular battery core 19 to the at least one submodule circuit board 26, a configuration circuit 30, and/or the battery management system 70, the battery submodule 20, in some examples, includes flexible connectors 28. The flexible connectors 28 are capable of being sizable in proportion with the sizing of the modular battery core 19.

For connecting the positive and negative terminals of each of the battery cell arrays 18 to the submodule positive and negative buses 22, 24, the battery submodule 20 includes a plurality of battery connections 50, which can be implemented via components of the at least one submodule circuit board 26 and/or can be implemented via other components in conjunction with the at least one submodule circuit board 26. The plurality of battery connections 50 can include one or more of welded connections, weldless connections, and any combinations thereof.

Figure 4:
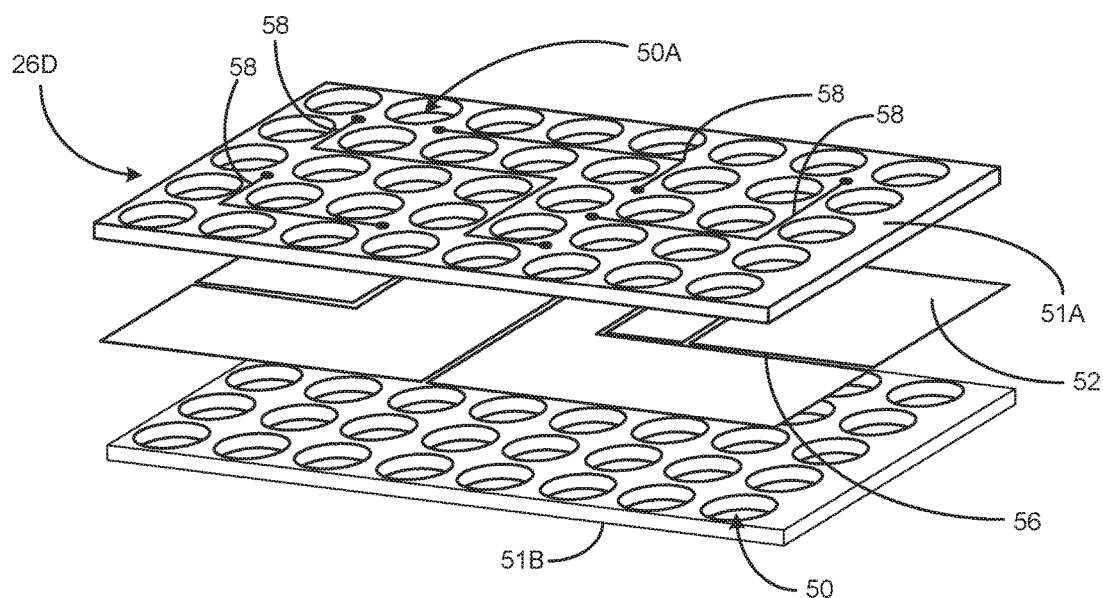
FIG. 4 is an exploded, perspective view of an exemplary circuit board, for use in connecting an array of battery cells to a battery submodule, in accordance with FIGS. 1-3 and the present disclosure.
Figure 5:
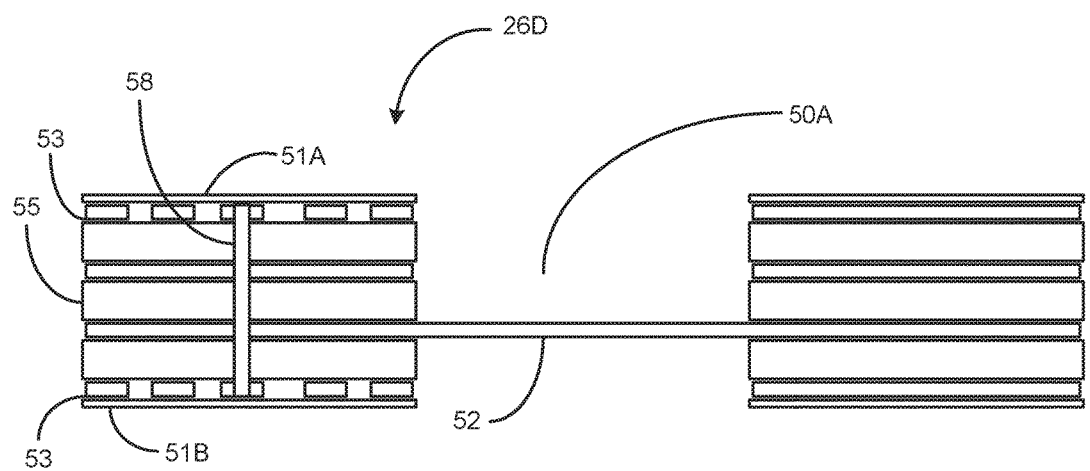
FIG. 5 is a cross sectional side view of the circuit board of FIG. 4, in accordance with FIGS. 1-4 and the present disclosure.

With regards to welded connections, FIGS. 4 and 5 illustrate an exemplary submodule circuit board 26D that includes a weldable connection layer 52. The weldable connection layer 52 may be a layer of a weldable metal, within the at least one submodule circuit 26, that is capable of having at least one terminal of one of the array of battery cells 18 welded thereto. The submodule circuit board 26D can connect at least one terminal of one of the array of battery cells 18 to one of the submodule positive bus 22 and the submodule negative bus 24. In this welded approach, the array of battery cells 18 is replaceably connected to the power system 10 and/or the submodule 20, by virtue of its capacity to be switched on and off via the switching unit 25 and/or the battery management system 70. Positive and negative terminals of the array of battery cells 18, when installed or in preparation for installation in the battery submodule 20, make contact with the weldable connection layer 52 via a plurality of terminal holes 50A, which are battery connections 50. The terminal holes 50A allow easy access for welding the array of battery cells 18 to and/or off of the submodule circuit board 26. Welding of the array of battery cells 18 to the weldable connection layer 52 can be accomplished using one or more of the techniques of resistance welding, laser welding, other welding techniques, and any combinations thereof.

The weldable connection layer 52 can be integrated into common printed circuit boards, by being located between a first solder mask 51A and a second solder mask 51B. In some examples, protective copper layers 53 and dielectric layers 55 may lie between the first and second solder masks 51A, 51B. Through vias 58 may intersect with the weldable connection layer 52. In some examples, the weldable connection layer 52 includes one or more separations 56, which may be utilized to bus one or more of the array of battery cells 18 together in any parallel or serial connections. To that end, each battery cell 16 to weldable connection layer 52 connection may have its own unique layer element, by virtue of one or more separations 56, which may then be connected to other members of the battery cell array 18 via, for example, the switching unit 25 and/or the battery management system 70. To that end, the weldable connection layer may define the one or more separations 56, such that the one or more separations 56 are capable of segmenting the weldable connection layer 52 for providing connections between two or more of the plurality of battery cells 16. Regardless of inclusion any layers other than the weldable connection layer 52, the exemplary welded connections, provided by the weldable connection layer 52, provide for a welded connection, thus minimizing power dissipation that can be associated with some non-welded connections, while also providing easy access for each battery cell 16 of the battery cell array 18.

Figure 6:
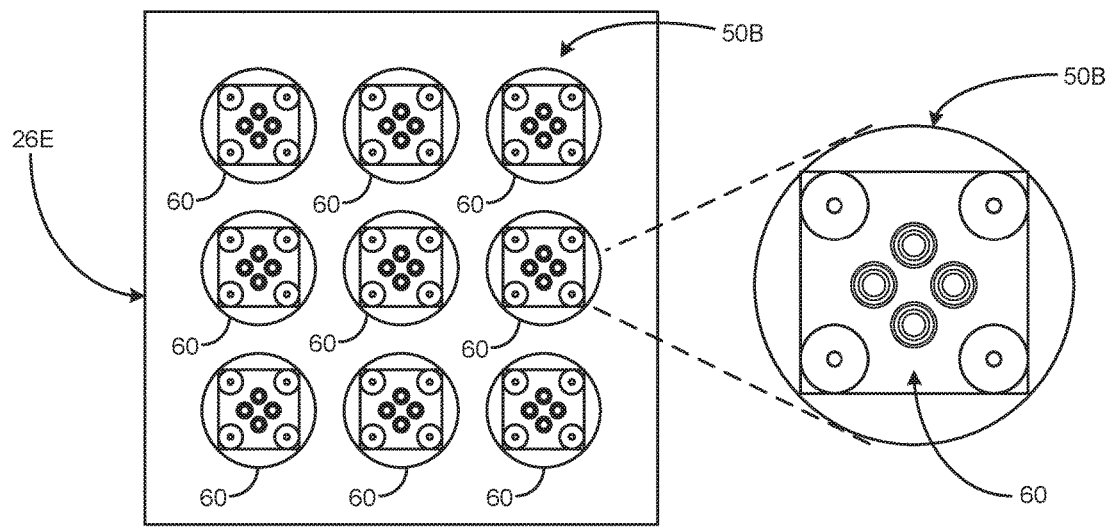
FIG. 6. is a side view of another example circuit board, for use in connecting an array of battery cells to a battery submodule, in accordance with FIGS. 1-3 and the present disclosure.
Figure 7:
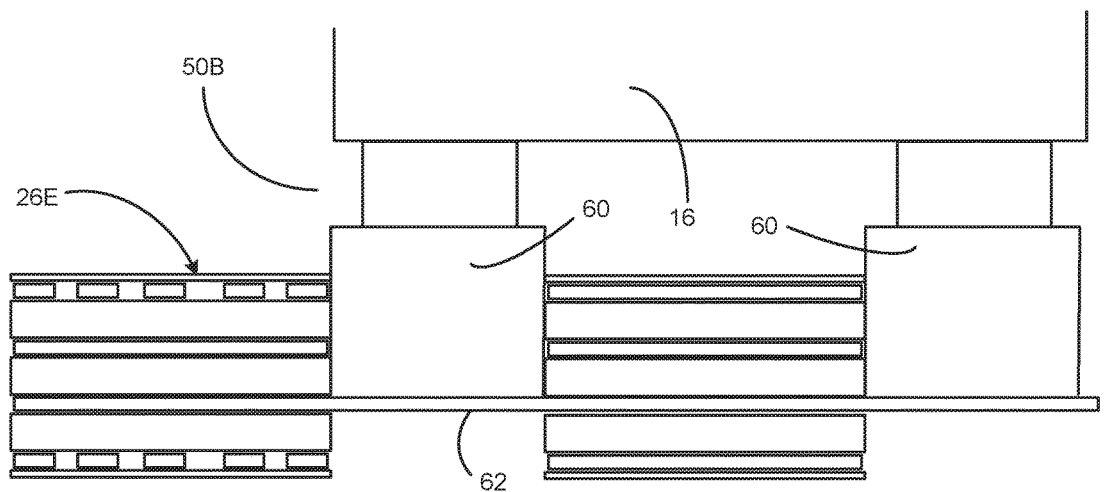
FIG. 7 is a cross sectional side view of the circuit board of FIG. 6, in accordance with FIGS. 1-4 and the present disclosure.

Additionally or alternatively, one or more of the battery cell array 18 can be electrically connected to the submodule circuit board 26 via one or more weldless connections 60. As depicted in FIGS. 6 and 7, one or more weldless connections 60 can be utilized to replaceably connect at least one terminal of one of the array of battery cells 18 to one of the submodule positive bus 22 and the submodule negative bus 24. Terminals of the array of battery cells 18, when installed or in preparation for installation in the battery submodule 20, make contact with a battery terminal contact layer 62, which then connects the terminal of the battery cell 16 to the submodule positive bus 22 or the submodule negative bus 24. In some examples, the weldless connections 60 can intersect with one of a plurality of terminal holes 50B, which are battery connections 50.

The weldless connections 60 provide optimized refurbishment and/or adaptability characteristics for the power system 10 and/or the battery submodule 20, as battery cells 16 can easily be replaced without the use of soldering and/or welding. Further, such ease of replacement may aid in easier upgradability for the battery submodule 20 and/or the power system 10. As weldless connection devices are easily accessible, use of the weldless connections 60 may provide for maximum reuse of battery submodule 20 and/or power system 10 components, without need for new, specialized components or equipment. Examples of devices which can embody the weldless connections 60 include, but are not limited to including, one or more of weldless spring pins, printed circuit board pins, and any combinations thereof.

Each of the one or more battery submodules 20 are interconnected via the configuration circuit 30. The configuration circuit 30 may be any circuit configured to interconnect each of the one or more battery submodules 20, operably connect the one or more battery submodules 20 to the power output 40, and, in some examples, reconfigure characteristics of the electrical output of the power system 10. In some examples, the configuration circuit 30 includes or is otherwise operatively associated with the battery management system 70.

As depicted in FIG. 1, paths or connections between elements of the power system 10, represented in the schematic diagram, that indicate a transmission or flow of electrical power are depicted in dark, bolded lines (e.g., the connections amongst submodule positive buses 22, connections amongst submodule negative buses 24, connections from submodule negative bus 24 to output negative bus 44, connections from submodule positive buses 22 to output positive bus 42, and connection between the power output 40 and the load 12). Accordingly, the configuration circuit 30 is configured to connect each of the one or more battery submodules 20 to the power output 40, which ultimately transmits electrical output power of each of the battery submodules 20 and, thus, each of the selected members of the plurality of battery cells 18, of each selected battery submodule 20, to the load 12. The power output 40 includes an output positive bus 42 and an output negative bus 44. Via connection to the configuration circuit 30, each of the submodule positive buses 22 are in operable connection with the output positive bus 42 and each of the submodule negative buses 24 are in operable connection with the output negative bus 44.

In some examples, the power output 40 is configured to receive input power transmission from the load 12. The input power transmission may be communicated, via the configuration circuit 30, to one or more of the battery submodules 20, and, ultimately, to one or more of the array of battery cells 18. As one or more of the array of battery cells 18 may be a rechargeable battery, the input power may be utilized to recharge one or more of the array of battery cells 18. Further, such input power may be utilized in cell power balancing amongst one or more of the battery cells 18. Accordingly, cell power balancing may be influenced and/or controlled by the battery management system 70.

In some examples, the configuration circuit 30 may include a power transmission circuit 35, which may interconnect, at least, power transmission of each of the battery submodules 20 and subsequently transmit the power received from the battery submodules 20 to the power output 40. The power transmission circuit 35 may include a plurality of battery interconnections 32, for interconnecting each of the battery submodules 20, such that their output power is combined. Accordingly, at the power transmission circuit 35, the output power of the battery submodules 20 may be conditioned, limited, or otherwise altered, prior to transmission to the power output 40. The power transmission circuit 35 may include any serial or parallel connections amongst the battery submodules 20, in accordance with a desired output power form the battery submodules 20. Further, after combining the output power of the battery submodules 20, the power transmission circuit 35 further includes an output transmission circuit 34, which transmits the combined output of the battery submodules 20 to the power output 40.

Further, interconnectivity between elements of the power system 10 of a communicative and/or data sharing nature, are depicted as dotted lines, which indicate that such communication may be performed by, or in conjunction with, the battery management system 70. The battery management system 70 may be integrated, in part, into the same or a similar circuit as the power transmission circuit 35 and/or the battery management system 70 may be independent of the power transmission circuit 35. The battery management system 70 is configured to communicatively couple, at least, the first battery submodule 20A, the second battery submodule 20B, and any additional battery submodules 20, up to an nth battery submodule 20N. Via such communicative coupling, the battery management system 70 is further configured to control, at least in part, output power of the first battery cell array 18A associated with the first battery submodule 20A, control, at least in part, output power of the second battery cell array 18B of the second battery submodule 20B, and, optionally, control, at least in part, some output power of any additional battery cell arrays 18, up to the nth battery cell array 18N of the nth battery submodule 20N.

Figure 8:
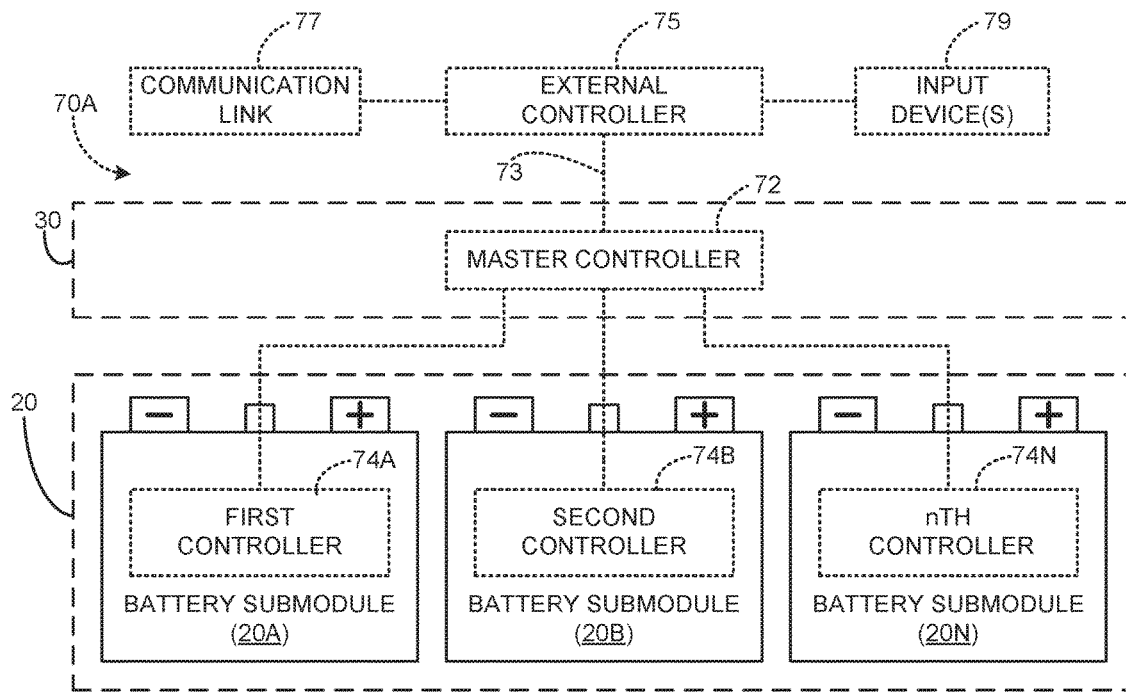
FIG. 8 is a schematic block diagram illustrating a configuration for a battery management system, for use in conjunction with the power system of FIGS. 1 and 2, in accordance with the present disclosure.

As shown first in a first schematic depiction of the battery management system 70A in FIG. 8, the battery management system 70 may include, at least, a first submodule controller 74A operatively associated with the first battery submodule 20A and a second submodule controller 74B operatively associated with the second battery submodule 20B. Optionally, additional submodule controllers 74N, for n number of battery submodules 20N, may be included, each operatively associated with a corresponding battery submodules 20N. Each of the submodule controllers 74 are configured to provide instructions to their respective battery submodules 20, to control output power of their respective battery cell array 18. Such instructions may direct, enable, or influence one or more of data communication amongst the first submodule controller 74A, the second submodule controller 74B, up to the nth submodule controller 74N, monitoring of one or more of the first battery cell array 18A, the second battery cell array 18B, up to the nth battery cell array 18N, controlling output power of one or both of the first battery cell array 18A, the second battery cell array 18B, up to the nth battery cell array 18N, connection and disconnection of one or more members the first battery cell array 18A, the second battery cell array 18B, up to the nth battery cell array 18N, and any combinations thereof.

In the example battery management system 70A of FIG. 8, the battery management system 70A includes a master controller 72. The master controller 72 is operatively associated with the first submodule controller 74A, the second submodule controller 74B, and, optionally, any additional n number of submodule controllers 74N. In such examples, the master controller 72, first submodule controller 74A, second submodule controller 74B, and nth submodule controller 74N are in a master-slave communicative relationship. In such a relationship, the master controller 72 is the "master" controller, while the first submodule controller 74A, second submodule controller 74B, and nth submodule controller 74n are "slave" controllers. In such examples, the master controller 72 is configured to provide instructions to each of the slave controllers 74A, 74B, 74N, such instructions configured to direct any of the slave controllers 74A, 74B, 74N perform, enable, or influence one or more of data communication amongst the first submodule controller 74A, the second submodule controller 74B, up to the nth controller 74N, monitoring of one or more of the first battery cell array 18A, the second battery cell array 18B, up to the nth battery cell array 18N, controlling output power of one or both of the first battery cell array 18A, the second battery cell array 18B, up to the nth battery cell array 18N, connection and disconnection of one or more members the first battery cell array 18A, the second battery cell array 18B, up to the nth battery cell array 18N, and any combinations thereof, in accordance with the master-slave relationship.

Figure 9:
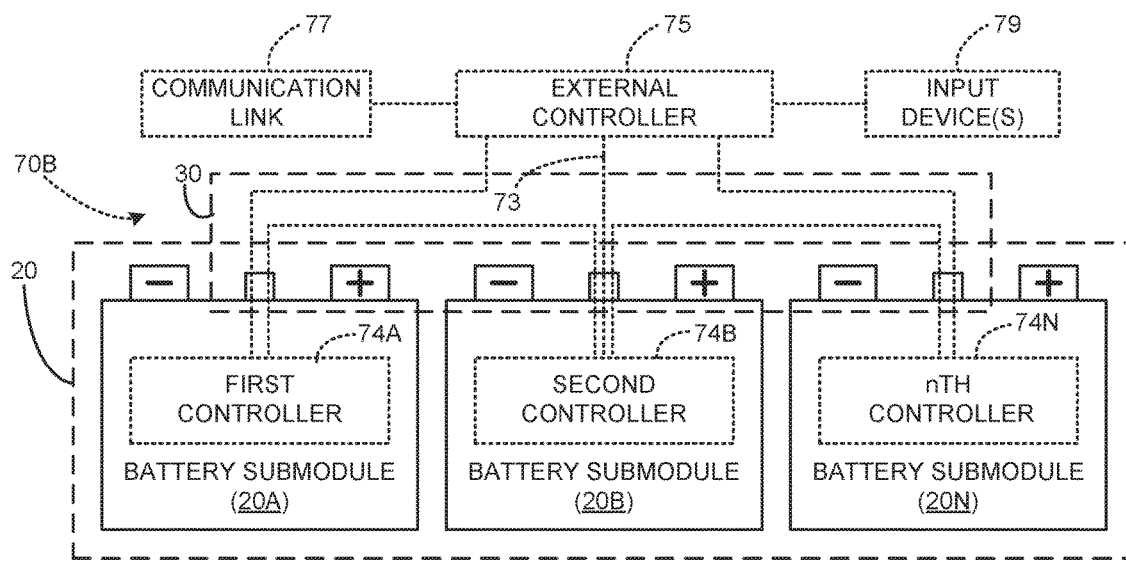
FIG. 9 is a schematic block diagram illustrating another configuration for a battery management system, for use in conjunction with the power system of FIGS. 1 and 2, in accordance with the present disclosure.

In some alternative examples, the submodule controllers 74A, 74B, 74N of a battery management system 70B are configured to communicate in accordance with a "peer-to-peer" communicative configuration, as depicted in FIG. 9. In such a peer-to-peer communicative relationship, each of the submodule controllers 74A, 74B, 74N is connected to at least one other submodule controller 74A, 74B, 74N via the communicative channels of the battery management system 70B. The battery management system 70B allows the submodule controllers 74A, 74B, 74N to communicate amongst themselves or with another controller or device. For example, the battery management system may employ Control Area Network bus (CANbus) implementation, Ethernet User Data Protocol (Ethernet UDP) communication linkage, may employ Modbus TCP/IP communication linkage, and/or may employ any communication linkage suitable for providing peer-to-peer communications amongst the submodule controllers 74A, 74B, 74N. To that end, any of the submodule controllers 74A, 74B, 74N are capable of determining, sharing, and/or communicating instructions configured to direct any of controllers 74A, 74B, 74N to perform, enable, or influence one or more of data communication amongst the first submodule controller 74A, the second submodule controller 74B, up to the nth controller 74N, monitoring of one or more of the first battery cell array 18A, the second battery cell array 18B, up to the nth battery cell array 18N, controlling output power of one or both of the first battery cell array 18A, the second battery cell array 18b, up to the nth battery cell array 18N, connection and disconnection of one or more members the first battery cell array 18A, the second battery cell array 18B, up to the nth battery cell array 18N, and any combinations thereof, in accordance with the peer-to-peer communicative relationship.

In some example implementations of the peer-to-peer relationship of the battery management system 70B of FIG. 9, only one of the submodule controllers 74 may be connected to an outside source like, for example, the external controller 75. For example, the first controller 74A may be the only controller directly connected to the external controller 75 and then the first submodule controller 74A may then provide instructions to each of the other submodule controllers 74B, 74N. Therefore, in such configurations, while still connected as a peer-to-peer relationship, the first submodule controller 74A may act as a "master" controller, arbitrating to each of the "slave" submodule controllers 74B, 74N. Such communication networks, in some examples, may be configured using a CANbus implementation.

As depicted in both FIGS. 8 and 9, one or more of the controllers 72, 74A, 74B, 74N are capable of being connected to an external data connection 73 of the battery management system. The external data connection is any data connection known in the art capable of transmitting data from an external controller 75, operatively associated with the battery management system 70, to one or more controllers of the battery management system 70 and, thus, the external controller 75 is in data communication with one or more of the controllers 72, 74A, 74B, 74N. The external controller 75 is capable of providing data to one or more of the controllers 72, 74A, 74B, 74N to influence one or more of data communication amongst the first submodule controller 74A, the second submodule controller 74B, up to the nth controller 74N, monitoring of one or more of the first battery cell array 18A, the second battery cell array 18B, up to the nth battery cell array 18N, controlling output power of one or both of the first battery cell array 18A, the second battery cell array 18B, up to the nth battery cell array 18N, connection and disconnection of one or more members the first battery cell array 18A, the second battery cell array 18B, up to the nth battery cell array 18N, and any combinations thereof. To that end, the external controller 75 may determine such data based on input from an input device 79, such as a server, a data input device (e.g., a keyboard, a touchscreen, a mouse, etc.), and the like. Alternatively, the input device 79 may be directly connected to one or more of the controllers 72, 74A, 74B, 74N, such that it may influence actions of said controllers. Further, such data or instructions to control any of the controllers 72, 74A, 74B, 74N may be transmitted to the external controller 75 and/or one or more of the controllers 72, 74A, 74B, 74N from an external source, via the communication link 73. The communication link may be any device, transceiver, and/or interface configured to connect one or more of the controllers 72, 74A, 74B, 74N, 75 to an outside data source, outside controller, or outside server, via direct connection or network connection. Further still, the communication link may include one or more transceivers operatively associated with one or more of the submodule controllers, 74A, 74B, 74N, which allow direct connection to external devices for the one or more submodule controllers 74A, 74B, 74N. Example elements and/or embodiments of the communication link 73 may include, but are not limited to including, wireless transceivers, WiFi connections, mobile network protocol devices, Bluetooth transceivers, CANbus connections, EIA/TIA 232 connections, EIA/TIA 422 connections, Universal Serial Bus (USB), and/or any other connective link system or apparatus known in the art.

As discussed above, in some examples, the battery submodules 20 include the switching devices 25 to connect or disconnect one or more of the battery cells 16 of the battery cell arrays 18, the battery submodules 20, and any combinations thereof. Accordingly, in such examples, the battery management system is configured to control the switching devices 25 to connect or disconnect one or more of the battery cells of the battery cell arrays, the battery submodules, and any combinations thereof. Such control may be based on power demand scaling instructions that are provided to the battery management system 70. The power demand scaling instructions are capable of being provided to the battery management system 70 by one or more of internal logic of one or more of the controllers 72, 74A, 74B, 74N, 75, user input from the input device(s) 79, preset instructions stored on a memory associated with one or more of the controller 72, 74A, 74B, 74N, 75, and any combinations thereof. In some examples, the power demand scaling instructions include instructions for controlling output power of the power system 10 in accordance with a sleep mode for the power system 10. The sleep mode may be configured to reduce power output when the power system 10 is operating to power the load 12, when the load 12 is in a generally inactive state. Accordingly, such a sleep mode may reduce power consumption amongst components of the power system 10 and, thus, extend life of the power system 10 and/or any of the plurality of battery cells 16 associated with the power system 10, during no load and low load conditions of the load 12.

Figure 10:
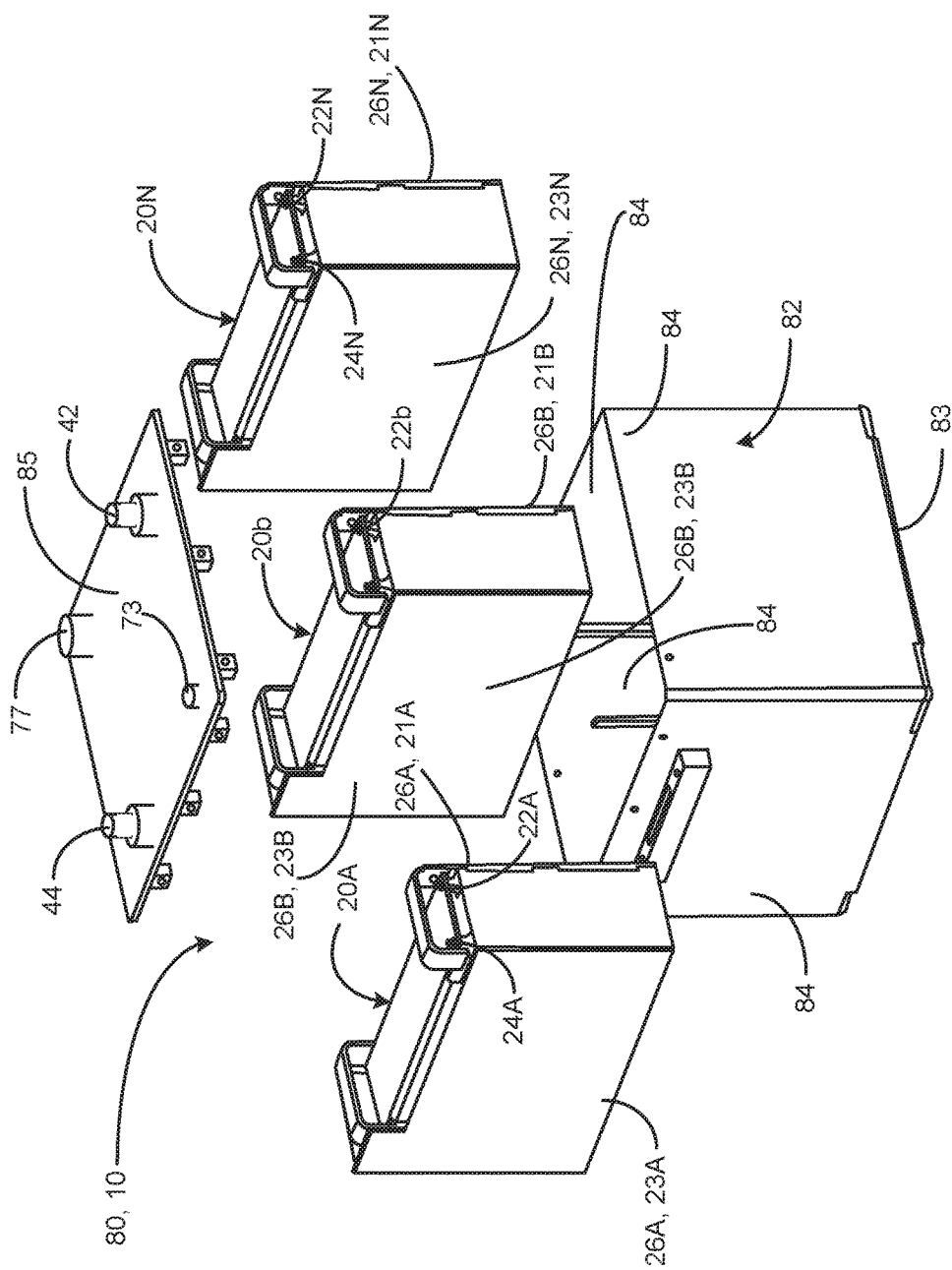
FIG. 10 is an exploded, perspective view of an exemplary implementation of the power system of FIGS. 1 and 2 as a modular battery, including a housing, in accordance with an embodiment of the present disclosure.

Turning now to FIG. 10, and with continued reference to FIGS. 1-9, a modular battery 80 is shown, wherein the modular battery 80 is constructed and/or embodied by the aforementioned elements of the power system 10. The modular battery 80 includes the battery submodules 20A, 20B, 20N, each including first and second circuit boards 21, 23 of their respective submodule circuit boards 26. While three submodules 20 are shown, it is certainly contemplated that the battery 80 may include any greater number of submodules 20 or may include any lesser number of submodules 20. Each battery submodule 20 is configured to be housed within a housing 82. The housing 82 includes a floor 83, a plurality of panels 84, and a removable panel 85. In some examples, the housing may include a cooling system, which may include one or more of vents, fans, coolant paths, other cooling systems known in the art, and any combinations thereof, capable of cooling one or more elements of the battery 80. The floor 83 and the panels 84 form a chamber, in which multiple battery submodules 20 can be placed and/or positioned therein. Once positioned, the removable panel 85 can be placed relative to the panels 84 and the chamber. The removable panel 85 includes connections for connecting each of the battery submodules 20 to the configuration circuit 30 and, in some examples, the configuration circuit 30 is contained, in part, on both the submodules 20 and the removable panel 85. To that end, the removable panel 85 can provide connections for the configuration circuit 30 to interconnect the battery submodules 20.

Further, the removable panel 85 is configured to enclose the battery submodules 20, when it is attached to the side walls 84. The power output 40 is, at least in part, integrated with the removable panel 85, such that the positive output bus 42 and the negative output bus 44 protrude, at least in part, outward of the removable panel 85, such that each of the output positive bus 42 and the output negative bus 44 are electrically connectable to the load 12. In some examples, the external data connection 73 is, at least in part, integrated with the removable panel 85. Further, in some examples a pressure equalization vent 77 may be included with the battery 80 and, at least in part, integrated with the removable panel 85.

Figure 11:
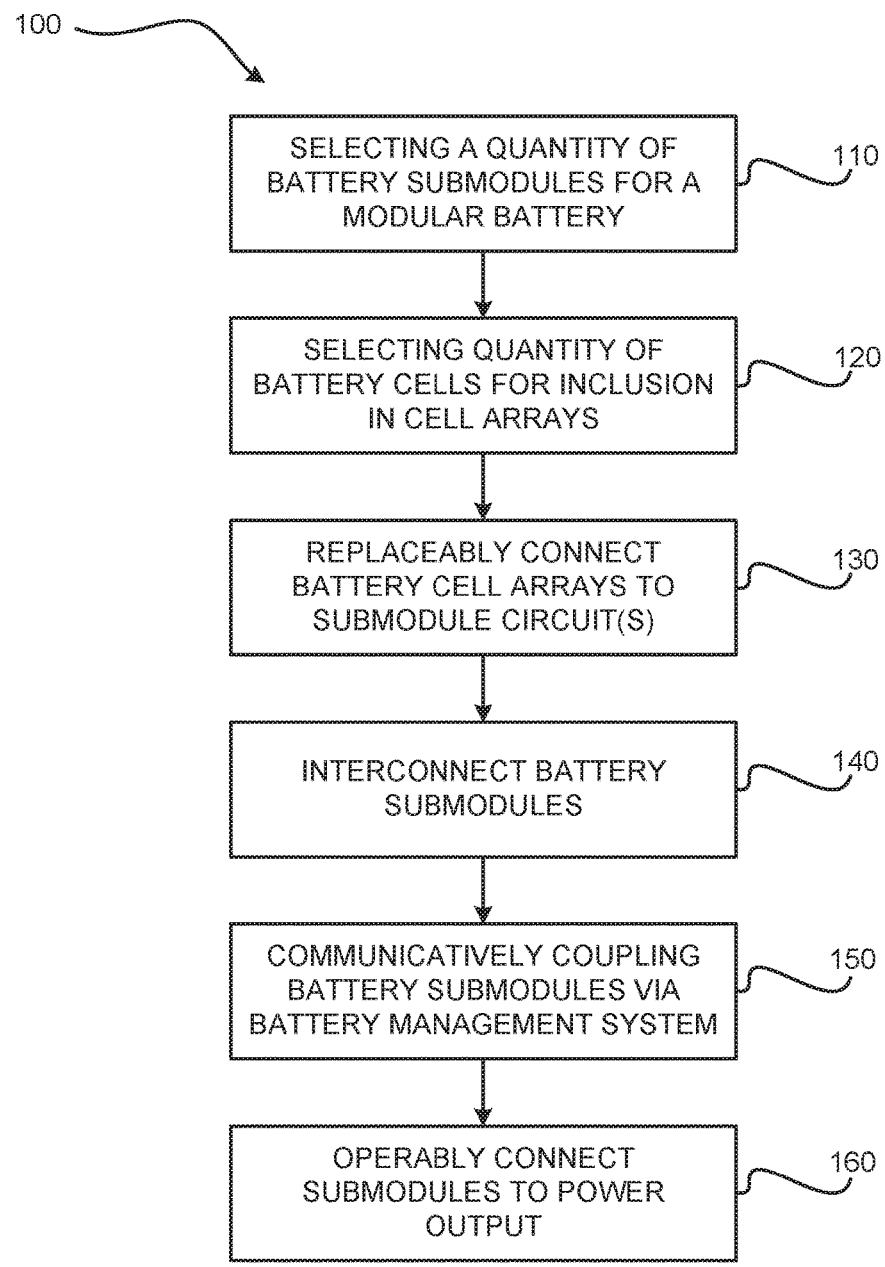
FIG. 11 is an exemplary flowchart for a method for configuring a power system, in accordance with an embodiment of the present disclosure.

By utilizing the systems, methods, and apparatus disclosed herein, output power to the load 12 can be user configured, without need for cost prohibitive configurations or replacements. Therefore, such user-configurable modular power systems 10, battery submodules 20, and/or modular batteries 80 can lower costs while also maintaining operational efficiency. To that end, FIG. 11 illustrates a flowchart for an example method 100 for configuring a power modular power system, the modular power system configured to supply configurable electrical power to a load. The method 100 is described, below, with reference to elements of the power system 10, as described in detail above with reference to FIGS. 1-10. However, the method 100 is certainly not limited to application in conjunction with the power system 10 and the method 100 is capable of being performed on or using other systems and/or apparatus. Further, the method 100 is not limited to being performed in the order shown in FIG. 12 and/or described below; thus, certain steps of the method 100 may be re-ordered or omitted and the ordering of the method 200 is non-limiting.

The method 100 begins at block 110, wherein a quantity of battery submodules 20, for use with the power system 10, is selected, as depicted in block 110. Of course, as discussed above, any number of battery submodules 20 may be selected and used in conjunction with the power system 10. Further, the method 100 includes selecting a number of battery cells 16 for inclusion in each of the battery cell arrays 18 of each of the battery submodules, as depicted in block 120. Selection of one or both of the quantity of battery submodules 20, the quantity of battery cells 16 in the battery cell arrays 18, and any combinations thereof, is based, at least, on a power demand to be output to the load 12, the power demand based on one or more of desired voltage capabilities, desired current capabilities, desired power capabilities, and any combinations thereof. Further still, selection of one or both of the quantity of battery submodules 20, the quantity of battery cells 16 in the battery cell arrays 18, and any combinations thereof, may be based, at least, on a range of power demands to be output to the load 12, which may include variations in power demand to be output to the load 12.

With such quantities selected, the method 100 continues by replaceably connecting at least one of the one or more battery cell arrays 18 to the at least one submodule circuit 26 to at least one of the one or more battery submodules 20, as depicted in block 130. As discussed above, such connecting can be accomplished using any welding or non-welding system, method, or apparatus known in the art.

Each of the one or more battery submodules 26 are then interconnected amongst each other, using the configuration circuit 30, as depicted in block 140. Accordingly, such interconnection can include both power and communicative interconnection. Further, the method 100 may include communicatively coupling the battery submodules 20, via the battery management system 70, as depicted in block 150. As discussed above, communicative coupling can be achieved by utilizing the battery management system 70, and any controllers thereof. To that end, such communicative coupling may include communicatively coupling any controllers 72, 74A, 74B, 74N, 75 of the battery management system 70 by configuring communications of such controllers in a master-slave relationship, a peer-to-peer relationship, or any other communicative relationship known in the art.

Further, the method 100 includes operably connecting each of the one or more battery submodules 20 to the power output 40, via the configuration circuit 30, such that power from at least one of the battery cell arrays 18 is capable of being output to the load 12 via the power output 12, as depicted in block 160. Additionally, in some examples, such connection may allow for the battery submodules 20 to receive power from the load 12, for recharging one or more battery cells 16 of one of the battery cell arrays 18.

Further, a flowchart for a method 200 for manufacturing a battery submodule, for use in a power system for providing configurable power to a load, is illustrated in FIG. 12. The method 200 is described, below, with reference to elements of the battery submodule(s) 20 and/or the power system 10, as described in detail above with reference to FIGS. 1-10. However, the method 100 is certainly not limited to application in conjunction with the battery submodule(s) 20 and/or the power system 10 and the method 200 is capable of being performed on or using other systems and/or apparatus. Further, the method 200 is not limited to being performed in the order shown in FIG. 12 and/or described below; thus, certain steps of the method 200 may be re-ordered or omitted and the ordering of the method 200 is non-limiting.

The method 200 begins at block 210, by determining a number of battery cells 16 for inclusion in a battery cell array 18 for the battery submodule 20, as depicted in block 110. Selection of the quantity of battery cells 16 in the battery cell arrays 18 is based, at least, on a power demand to be output from the submodule 20, the power demand based on one or more of desired voltage capabilities, desired current capabilities, desired power capabilities, and any combinations thereof.

The method further includes manufacturing the at least one submodule circuit board 26, based, at least in part, on the number of battery cells of the battery cell array 18, as depicted in block 220. The at least one circuit board 26 is manufactured to include a plurality of positive input terminals corresponding to a plurality of positive battery cell terminals, each of the plurality of positive battery cell terminals of a corresponding one of the array of battery cells 18. Further, the at least one circuit board 26 is manufactured to include a plurality of negative input terminals corresponding to a plurality of negative battery cell terminals, each of the plurality of negative battery cell terminals of a corresponding one of the array of battery cells 18. In some examples, manufacturing the at least one circuit board 26 includes manufacturing the first circuit board, which includes the plurality of positive input terminals, and manufacturing the second circuit board 23, including the plurality of negative input terminals. Further still, in some examples, manufacturing the at least one circuit board 26 includes forming a weldable connection layer 52 within the at least one circuit board 26, as discussed above. In some such examples, manufacturing the at least one circuit board 26 further includes defining one or more separations 56 in the weldable connection layer 52, as discussed above.

In some examples, the method includes forming a modular battery core 19, for housing the array of battery cells, as depicted in block 230. In some further examples, the modular battery core 19 may be resized for alterations for a battery cell array 18 having a different quantity of battery cells 16. In some additional or alternative examples, the method includes connecting a submodule controller 74 and/or the battery management system 70 to the at least one circuit board 26, as depicted in block 240. In some such examples, the submodule controller 74 is a communication linkage to of the submodule 20, wherein the controller 74 may be a link to the battery management system 70, for communication with one or more other battery submodules 20. With the at least one circuit board 26, at least in part, configured, the method 200, in examples wherein a battery core 19 is utilized, includes flexibly connecting the at least one circuit board 26 to the battery core 19, as depicted in block 250.

The method 200 further includes connecting each of the plurality of positive input terminals of the at least one circuit board to a positive bus 22 for the battery submodule and connecting each of the plurality of negative input terminals of the at least one circuit board to a negative bus 24 for the battery submodule, as depicted in blocks 260, 270. In some examples, connecting each of the plurality of positive input terminals of the at least one circuit board 26 to the positive bus 22 includes incorporating the positive bus 22 in the at least one circuit board 26. Similarly, in some examples, connecting each of the plurality of negative input terminals of the at least one circuit board 26 to the negative bus 24 includes incorporating the negative bus 24 in the at least one circuit board 26.

Further, the method 200 includes replaceably connecting one or more of the array of battery cells 18 to the at least one circuit board 26 at one of the plurality of positive input terminals and one of the plurality of negative input terminals, as depicted in block 280. In some examples, replaceably connecting one or more of the array of battery cells 18 to the at least one circuit board 26 includes connecting at least one of the positive battery cell terminal or the negative battery cell terminal of one of the array of battery cells 18 to the at least one circuit board 26 via a weldless battery connection 50B. Alternatively, in some examples, replaceably connecting one or more of the array of battery cells 18 to the at least one circuit 26 includes connecting at least one of the positive battery cell terminals or the negative battery cell terminals of one of the array of battery cells 18 to the at least one circuit board via welded connections, such as the weldable connection layer 52, as discussed above. Further, in some examples, the method 200 includes installing a communication linkage, such as various elements of the battery management system 70, as depicted in block 290.

While the foregoing detailed description has been given and provided with respect to certain specific examples, it is to be understood that the scope of the disclosure should not be limited to such examples, but that the same are provided simply for enablement and best mode purposes. The breadth and spirit of the present disclosure is broader than the examples specifically disclosed and encompassed within the claims appended hereto. Moreover, while some features are described in conjunction with certain specific examples, these features are not limited to use with only the example with which they are described, but instead may be used together with or separate from, other features disclosed in conjunction with alternate examples.

What is claimed is:

1. A modular power system (10) configured to supply configurable electrical power to a load (12), the modular power system comprising:
   a first battery submodule (20A) and a second battery submodule (20B), each of the first and second battery submodules including:
   a submodule positive bus (22),
   a submodule negative bus (24), and
   at least one submodule circuit configured to replaceably connect one or more of a plurality of battery cells (16) to the submodule positive bus and the submodule negative bus;
   a power output (40) in operable connection with the first and second battery submodules and configured to receive electrical power transmission from one or more of the plurality of battery cells, via the first and second battery submodules, and transmit electrical power to the load;
   a configuration circuit (30) configured to interconnect each of the first and second battery submodules, operably connect the first and second battery submodules to the power output, and reconfigure characteristics of electrical power output; and a battery management system (70) communicatively coupled with the first and second battery submodules, the battery management system including:

a first controller (74A) operatively associated with the first battery submodule and configured to provide instructions to the first battery submodule to control power output of at least a first battery cell array (18A) of the plurality of battery cells, the first battery cell array operatively coupled with the first battery submodule and configured to selectively provide electrical power to the power output; and a second controller (74B) operatively associated with the second battery submodule and configured to provide instructions to the second battery submodule to control power output of at least a second battery cell array (18B) of the plurality of battery cells, the second battery cell array operatively coupled with the second battery submodule and configured to selectively provide electrical power to the power output.

2. The modular power system of claim 1, wherein the power output further includes an output positive bus (42) and an output negative bus (44), the positive output bus in operable connection with at least one submodule positive bus of the first battery submodule and the output negative bus in operable connection with at least one submodule negative bus of the second battery submodule; and wherein the power output is configured to transmit electrical power to the load via the output positive bus and the output negative bus.

3. The modular power system of claim 1, wherein the first and second controllers operate in a peer-to-peer communicative configuration to perform one or more of data communication amongst the first and second controllers, monitoring of one or both of the first and second battery cell arrays, controlling power output of one or both of the first and second battery cell arrays, connection and disconnection of one or more members of first battery cell array, connection and disconnection of one or more members of the second battery cell array, and any combinations thereof.

4. The modular power system of claim 1, wherein the battery management system further includes a controller (74) configured to perform, via connections of the battery management system, one or more of data communication amongst the first and second controllers, monitoring of one or both of the first and second battery cell arrays, controlling power output of one or both of the first and second battery cell arrays, connection and disconnection of one or more members of first battery cell array, connection and disconnection of one or more members of the second battery cell array, and any combinations thereof, and an external data connection (73), the external data connection configured to connect the controller to an external controller (75), the external controller configured to be in data communication with the controller via the external data connection, the external controller capable of providing data to the controller to influence one or more of data communication amongst the first and second controllers, monitoring of one or both of the first and second battery cell arrays, controlling power output of one or both of the first and second battery cell arrays, connection and disconnection of one or more members of first battery cell array, connection and disconnection of one or more members of the second battery cell array, and any combinations thereof and receive data related to performance of one or more of data communication amongst the first and second controllers, monitoring of one or both of the first and second battery cell arrays, controlling power output of one or both of the first and second battery cell arrays, connection and disconnection of one or more members of first battery cell array, connection and disconnection of one or more members of the second battery cell array, and any combinations thereof.

5. The modular power system of claim 1, wherein the battery management system further includes a master controller (72) operatively associated with the first controller and the second controller, wherein the first controller is a first slave controller and the second controller is a second slave controller, and wherein the master controller directs the first and second controllers perform one or more of data communication amongst the first and second controllers, monitoring of one or both of the first and second battery cell arrays, controlling power output of one or both of the first and second battery cell arrays, connection and disconnection of one or more members of the first battery cell array, connection and disconnection of one or more members of the second battery cell array, and any combinations thereof, in accordance with a master-slave communicative relationship.

6. The modular power system of claim 1, wherein the battery management system is further configured to provide communication amongst at least one of the first and second battery submodules, the configuration circuit, the power output, and any combinations thereof, said communication regarding one or more of data communication, monitoring of one or both of the first and second battery cell arrays, controlling power output of one or both of the first and second battery cell arrays, connection and disconnection of one or more members of first battery cell array, connection and disconnection of one or more members of the second battery cell array, and any combinations thereof.

7. The modular power system of claim 1, wherein the power output is configured to receive input power transmission from the load, the input power transmission provided to one or more of the plurality of battery cells.

8. A modular power system (10) configured to supply configurable electrical power to a load (12), the modular power system comprising:

a first battery submodule (20A) and a second battery submodule (20B), each of the first and second battery submodules including:

a submodule positive bus (22), a submodule negative bus (24), and at least one submodule circuit configured to replaceably connect one or more of a plurality of battery cells (16) to the submodule positive bus and the submodule negative bus;

a power output (40) in operable connection with the first and second battery submodules and configured to receive electrical power transmission from one or more of the plurality of battery cells, via the first and second battery submodules, and transmit electrical power to the load;

a configuration circuit (30) configured to interconnect each of the first and second battery submodules, operably connect the first and second battery submodules to the power output, and reconfigure characteristics of electrical power output;

a battery management system (70) communicatively coupled with the first and second battery submodules, the battery management system being configured to:
control, at least in part, power output of a first battery cell array (18A) of the plurality of battery cells, the first battery cell array operatively coupled with the first battery submodule and configured to selectively provide electrical power for the power output;
control, at least in part, power output of a second battery cell array (18B) of the plurality of battery cells, the second battery cell array operatively coupled with the second battery submodule and configured to selectively provide electrical power for the power output; and
a plurality of switches (25), each of the plurality of switches configured to connect or disconnect one or more of one of the battery cells of the first battery cell array, one of the battery cells of the second battery cell array, the first battery submodule, the second battery submodule, and any combinations thereof, and
wherein the battery management system is configured to control the plurality of switches to connect or disconnect the one or more of one of the battery cells of the first battery cell array, one of the battery cells of the second battery cell array, the first battery submodule, the second battery submodule, and any combinations thereof, based on power demand scaling instructions provided to the battery management system.

9. The modular power system of claim 8, wherein the power demand scaling instructions are provided to the battery management system by one or more of internal logic of a controller associated with the battery management system, a user input (79) provided to the controller, preset instructions stored on a memory associated with the controller, and any combinations thereof.

10. The modular power system of claim 8, wherein the power demand scaling instructions include instructions for controlling power output of the modular power system in accordance with a sleep mode for the modular power system.

11. A modular power system (10) configured to supply configurable electrical power to a load (12), the modular power system comprising:
one or more battery submodules (20), each of the one or more battery submodules including:
a submodule positive bus (22),
a submodule negative bus (24), and
at least one submodule circuit configured to replaceably connect one or more of a plurality of battery cells (16) to the submodule positive bus and the submodule negative bus;
a power output (40) in operable connection with each of the one or more battery submodules and configured to receive electrical power transmission from one or more of the plurality of battery cells, via the one or more battery submodules, and transmit electrical power to the load;
a configuration circuit (30) configured to interconnect each of the one or more battery submodules, operably connect the one or more battery submodules to the power output, and reconfigure characteristics of electrical power output; and
a housing, the housing (82) including:
a floor (83) configured to receive the one or more battery submodules,
a plurality of panels (84) substantially attachable to the floor and surrounding the one or more battery submodules, when the modular power system is configured to provide power to the load, and
a removable panel (85) configured to, in combination with the floor and plurality of side walls, enclose the one or more battery submodules, when the modular power system is configured to provide power to the load, and the power output is, at least in part, integrated with the removable panel, the power output having an output positive bus and an output negative bus, each of the output positive bus and the output negative bus protruding, at least in part, outward of the removable panel such that each of the output positive bus and the output negative bus are connectable to the load.

12. A battery submodule (20) for use with a modular battery (10, 80) for use in a modular power system (10), the modular battery configured to supply configurable power to a load (12), the battery submodule comprising:
a positive bus (42);
a negative bus (44); and
at least one circuit board (26) configured to replaceably connect one or more of a plurality of battery cells (16) to the positive bus and the negative bus, the at least one circuit board configured to provide interconnection of the battery submodule with one or more additional battery submodules and to selectively transmit electrical power from one or more of the plurality of battery cells to an output of the modular power system; and
wherein the at least one circuit board includes a first circuit board (21) and a second circuit board (23), the first circuit board operatively associated with the positive bus and a positive terminal of at least one of the plurality of battery cells, and the second circuit board operatively associated with the negative bus and a negative terminal of at least one of the plurality of battery cells.

13. The battery submodule of claim 12, wherein the at least one circuit board is configured to provide interconnection of the battery submodule with the one or more additional battery submodules via a configuration circuit (30) of the modular battery, the configuration circuit configured to interconnect the battery submodule with the one or more additional battery submodules.

14. The battery submodule of claim 12, further comprising a switching device (25) configured to control configurable power output to the load by performing one or more of connecting of one or more of the plurality of battery cells to the at least one circuit board, disconnecting of one or more of the plurality of battery cells to the at least one circuit board, reconfiguring a connection between two or more of the plurality of battery cells, and any combinations thereof.

15. The battery submodule of claim 14, wherein the switching device includes one or more of a field effect transistor (FET), an electromechanical switch, a relay, a contractor, and any combinations thereof.

16. The battery submodule of claim 12, further comprising one or more submodule sensors (27) operatively associated with the at least one circuit board and configured to sense operation data associated with one or more of the plurality of battery cells, the at least one circuit board, and any combinations thereof, the operation data including one or more of voltage data, current data, temperature data, cell balance data, and any combinations thereof.

17. The battery submodule of claim 12, further comprising an array of submodule battery cells, the array of submodule battery cells being members of the plurality of battery cells.

18. The battery submodule of claim 12, wherein the at least one circuit board is configured to replaceably connect at least one terminal of one of the plurality of battery cells to one of the positive bus and the negative bus via one or more weldless battery connections (50B).

19. The battery submodule of claim 12, wherein the positive bus and the negative bus are incorporated in the at least one circuit board.

20. The battery submodule of claim 12, wherein the positive bus and the negative bus are configured for receiving input power transmission and for providing an input transmission to one or more of the plurality of battery cells.

21. A battery submodule (20) for use with a modular battery (10, 80) for use in a modular power system (10), the modular battery configured to supply configurable power to a load (12), the battery submodule comprising:
 a positive bus (42);
 a negative bus (44); and
 at least one circuit board (26) configured to replaceably connect one or more of a plurality of battery cells (16) to the positive bus and the negative bus, the at least one circuit board configured to provide interconnection of the battery submodule with one or more additional battery submodules and to selectively transmit electrical power from one or more of the plurality of battery cells to an output of the modular power system; and
 wherein the at least one circuit board includes a weldable connection layer (52), the weldable connection layer being a layer of a weldable metal that is capable of having at least one terminal of one of the plurality of battery cells replaceably welded thereto, and
 wherein the at least one circuit board is configured to replaceably connect the at least one terminal of one of the plurality of battery cells to one of the positive bus and the negative bus via the weldable connection layer.

22. The battery submodule of claim 21, wherein the weldable connection layer defines one or more separations (56), the one or more separations capable of segmenting the weldable connection layer for providing connections between two or more of the plurality of battery cells.

23. A battery submodule (20) for use with a modular battery (10, 80) for use in a modular power system (10), the modular battery configured to supply configurable power to a load (12), the battery submodule comprising:
 a positive bus (42);
 a negative bus (44); and
 at least one circuit board (26) configured to replaceably connect one or more of a plurality of battery cells (16) to the positive bus and the negative bus, the at least one circuit board configured to provide interconnection of the battery submodule with one or more additional battery submodules and to selectively transmit electrical power from one or more of the plurality of battery cells to an output of the modular power system;
 a modular battery core (19), the modular battery core for housing a number of battery cells of the plurality of battery cells and configured to be sizable in proportion with the number of battery cells of the plurality of battery cells desired for design of the battery submodule; and
 flexible connectors (28) configured to connect the modular battery core and the at least one circuit board, the flexible connectors capable of being sizable in proportion with sizing of the modular battery core.

24. A method (200) for manufacturing a battery submodule (20), the battery submodule for use in a modular power system (10) for providing configurable power to a load (12), the method comprising:
 determining a number of battery cells for an array of battery cells (18), each of the array of battery cells selected from a plurality of battery cells (16);
 manufacturing at least one circuit board (26) based, at least in part, on the number of battery cells for the array of battery cells, the at least one circuit board manufactured to include a plurality of positive input terminals corresponding to a plurality of positive battery cell terminals, each of the plurality of positive battery cell terminals of a corresponding one of the array of battery cells, and the at least one circuit board manufactured to include a plurality of negative input terminals corresponding to a plurality of negative battery cell terminals, each of the plurality of negative battery cell terminals of a corresponding one of the array of battery cells;
 connecting each of the plurality of positive input terminals of the at least one circuit board to a positive bus (22) for the battery submodule;
 connecting each of the plurality of negative input terminals of the at least one circuit board to a negative bus (24) for the battery submodule; and
 replaceably connecting one or more of the array of battery cells to the at least one circuit board at one of the plurality of positive input terminals and one of the plurality of negative input terminals.

25. The method of claim 24, further comprising connecting a submodule controller (74) to the at least one circuit board, the submodule controller configured for compatibility with a battery management system (70) of the modular power system.

26. The method of claim 24, further comprising installing a communication linkage (74) to the at least one circuit board, the communication linkage configured to connect the battery submodule with, at least, a second submodule associated with the modular power system.

27. The method of claim 24, wherein manufacturing the at least one circuit board includes manufacturing a first circuit board (21) including the plurality of positive input terminals and manufacturing a second circuit board (23) including the plurality of negative input terminals.

28. The method of claim 24, wherein replaceably connecting one or more of the array of battery cells to the at least one circuit board includes connecting at least one of the plurality of positive battery cell terminals or the plurality of negative battery cell terminals of one of the array of battery cells to the at least one circuit board via a weldless battery connection (50).

29. The method of claim 24, wherein manufacturing the at least one circuit board based, at least in part, on the number of battery cells for the array of battery cells includes forming a weldable connection layer (52) within the at least one circuit board, the weldable connection layer being a layer of a weldable metal, and
 wherein replaceably connecting one or more of the array of battery cells to the at least one circuit includes connecting at least one of the positive battery cell terminals or the negative battery cell terminals of one of the array of battery cells to the at least one circuit board via the weldable connection layer.

30. The method of claim 29, wherein manufacturing the at least one circuit board based, at least in part, on the number of battery cells for the array of battery cells further includes defining one or more separations (56) in the weldable connection layer, the one or more separations capable of segmenting the weldable connection layer for providing connections between two or more of the array of battery cells.

31. The method of claim 24, further comprising forming a modular battery core (19) for housing the array of battery cells, and
flexibly connecting the at least one circuit board to the modular battery core.

32. The method of claim 31, further comprising resizing the modular battery core for a second array of battery cells of the plurality of battery cells, the second array of battery cells having a second number of battery cells, the second number of battery cells greater than or less than the number of battery cells for the array of battery cells.

33. The method of claim 24, wherein connecting each of the plurality of positive input terminals of the at least one circuit board to the positive bus for the battery submodule includes incorporating the positive bus in the at least one circuit board; and
connecting each of the plurality of negative input terminals of the at least one circuit board to the negative bus for the battery submodule includes incorporating the negative bus in the at least one circuit board.

34. A method (100) for configuring a modular power system (10), the modular power system configured to supply configurable electrical power to a load (12), the method comprising:
selecting a quantity of battery submodules for one or more battery submodules (20), the one or more battery submodules including at least a first battery submodule (20A) and a second battery submodule (20B), each of the one or more battery submodules including a submodule positive bus (22), a submodule negative bus (24), and at least one submodule circuit (26) configured to replaceably connect one or more of a plurality of battery cells (16) to the submodule positive bus and the submodule negative bus;
selecting a first quantity of battery cells, from the plurality of battery cells, for inclusion in a first battery cell array (18A), and selecting a second quantity of battery cells, from the plurality of battery cells, for inclusion in a second battery cell array (18B);
replaceably connecting the first battery cell array to the at least one submodule circuit of the first battery submodule, and replaceably connecting the second battery cell array to the at least one submodule circuit of the second battery submodule;
interconnecting each of the first and second battery submodules using a configuration circuit (30) of the modular power system;
operably connecting each of the first and second battery submodules to a power output (40) of the modular power system, via the configuration circuit, such that electrical power from at least one of the first and second battery cell arrays is capable of being output to the load via the power output;
communicatively coupling the first battery submodule with the second battery submodule via a battery management system (70), the battery management system including:
a first controller (74A) operatively associated with the first battery submodule and configured to provide instructions to the first battery submodule to control power output of at least the first battery cell array (18A); and
a second controller (74B) operatively associated with the second battery submodule and configured to provide instructions to the second battery submodule to control power output of at least the second battery cell array (18B); and
configuring the first and second controllers to operate in a peer-to-peer communicative configuration to perform one or more of data communication amongst the first and second controllers, monitoring of one or both of the first and second battery cell arrays, controlling power output of one or both of the first and second battery cell arrays, connection and disconnection of one or more members of the first battery cell array, connection and disconnection of one or more members of the second battery cell array, and any combinations thereof.

35. The method of claim 34, wherein selecting at least one of the quantity of battery submodules, the first quantity of battery cells in the first battery cell array, and the second quantity of battery cells in the second battery cell array, is based, at least, on a power demand to be output to the load, the power demand based on one or more of desired voltage capabilities, desired current capabilities, desired power capabilities, and any combinations thereof.

36. The method of claim 34, wherein selecting at least one of the quantity of battery submodules, the first quantity of battery cells in the first battery cell array, and the second quantity of battery cells in the second battery cell array, is based, at least, on a range of power demand to be output to the load, the range of power demand based on one or more of desired voltage capabilities, desired current capabilities, desired power capabilities, and any combinations thereof.

37. The method of claim 34, wherein interconnecting each of the first and second battery submodules, via the configuration circuit, includes connecting each submodule positive bus of the first and second battery submodules with an output positive bus (42) of the power output and connecting each submodule negative bus of the first and second battery submodules with an output negative bus (44) of the power output.

38. A method (100) for configuring a modular power system (10), the modular power system configured to supply configurable electrical power to a load (12), the method comprising:
selecting a quantity of battery submodules for one or more battery submodules (20), the one or more battery submodules including at least a first battery submodule (20A) and a second battery submodule (20B), each of the one or more battery submodules including a submodule positive bus (22), a submodule negative bus (24), and at least one submodule circuit (26) configured to replaceably connect one or more of a plurality of battery cells (16) to the submodule positive bus and the submodule negative bus;
selecting a first quantity of battery cells, from the plurality of battery cells, for inclusion in a first battery cell array (18A), and selecting a second quantity of battery cells, from the plurality of battery cells, for inclusion in a second battery cell array (18B);
replaceably connecting the first battery cell array to the at least one submodule circuit of the first battery submodule, and replaceably connecting the second battery cell array to the at least one submodule circuit of the second battery submodule;
interconnecting each of the first and second battery submodules using a configuration circuit (30) of the modular power system;

operably connecting each of the first and second battery submodules to a power output (40) of the modular power system, via the configuration circuit, such that electrical power from at least one of the first and second battery cell arrays is capable of being output to the load via the power output;

communicatively coupling the first battery submodule with the second battery submodule via a battery management system (70), the battery management system including:
- a first controller operatively associated with the first battery submodule and configured to provide instructions to the first battery submodule to control power output of at least the first battery cell array,
- a second controller operatively associated with the second battery submodule and configured to provide instructions to the second battery submodule to control power output of at least the second battery cell array; and
- a master (72) controller operatively associated with the first controller and the second controller, wherein the first controller is a first slave controller and the second controller is a second slave controller, and the method further comprising configuring the first, second, and master controllers to operate in accordance with a master-slave communication relationship to perform one or more of data communication amongst the first and second controllers, monitoring of one or both of the first and second battery cell arrays, controlling power output of one or both of the first and second battery cell arrays, connection and disconnection of one or more members of the first battery cell array, connection and disconnection of one or more members of the second battery cell array, and any combinations thereof.

* * * * *